United States Patent [19]

Bankowski et al.

[11] 3,876,989

[45] Apr. 8, 1975

[54] CCD OPTICAL SENSOR STORAGE DEVICE HAVING CONTINUOUS LIGHT EXPOSURE COMPENSATION

[75] Inventors: Walter F. Bankowski, Poughkeepsie; Vijay R. Kumar, Fishkill; John D. Tartamella, Poughkeepsie, all of N.Y.

[73] Assignee: International Business Machines Corporation, Armonk, N.Y.

[22] Filed: June 18, 1973

[21] Appl. No.: 370,873

[52] U.S. Cl........... 340/173 R; 307/221 D; 307/304; 340/173 LS; 340/173 RC; 357/24

[51] Int. Cl... G11c 21/00; G11c 11/42; G01l 11/14

[58] Field of Search.... 307/304, 221 D; 317/235 G; 340/173 LS, 173 RC

[56] References Cited

UNITED STATES PATENTS 3,760,202 9/1973 Kosonocky .................... 317/235 G

OTHER PUBLICATIONS

Altman, The New Concept for Memory and Imaging: Charge Coupling, Electronics, 6/21/71, pp. 50–59.

Tompsett et al., Charge-Coupled Imaging Devices: Experimental Results, IEEE Transactions on Electron Devices, 11/71, pp. 992–996.

*Primary Examiner*—Stuart N. Hecker

*Attorney, Agent, or Firm*—Harold H. Sweeney, Jr.

[57] ABSTRACT

A charge coupled device shift-register optical sensor with storage is provided which is capable of compensating automatically for continuous image exposure. Selected gates of the shift register are pre-disposed for a given time duration to sense the optical image in potential wells under the selected gates. Subsequently, other gates are pre-disposed sequentially to shift the sensed image along the shift register. The recorded image data is regenerated by the regenerating circuitry after a predetermined number of shifts so that the accumulated shift time giving rise to image exposure is less than the exposure time to provide total image sensing, thereby, providing a means for distinguishing between the full duration sensed image data and the image data sensed during shifting as a result of said continuous optical conveying of the image onto the shift register. The storage function is provided by recirculating the data from the output back to the input.

1 Claim, 4 Drawing Figures

CCD OPTICAL SENSOR STORAGE DEVICE HAVING CONTINUOUS LIGHT EXPOSURE COMPENSATION

BACKGROUND OF THE INVENTION

The present invention relates to the use of charge coupled device shift-registers to perform optical sensing and, more particularly, it relates to an arrangement for compensating for the effect of continuous optical image exposure of the shift register during shift operations.

It is well known that charge coupled devices (CCD's) can be used to optically sense data and that the data so sensed can be shifted from stage to stage within the register to an output. The image is transferred optically onto the CCD shift register creating a charge which is stored in a potential "well" created in a semiconductor. This charge is then transferred along the semi-conductor surface in shift register fashion, by simple manipulation of the voltages that constrain it. The charge is a function of the intensity and duration of the applied light in the proximity of the well. The data stored in the well is shifted out of the shift register, bit by bit, by changing potentials on electrodes associated with each bit one at a time so that the data spills out of the sensing potential well into a well created under an adjacent electrode, and so on from one well to another.

The prior art CCD shift register is exposed to an image which is conveyed thereto by an optical system in which the light source is maintained in the on condition for a period of time sufficient for the charge to accumulate in the well under electrodes which have the correct potential applied thereto allowing charge accumulation. It will be appreciated, that the amount of time that the CCD device is exposed to the image is critical and, therefore, a non-light sensitive storage area is required or a timing circuit to turn the light source of the optical system on and off is necessary or a precise shuttering system is required.

In accordance with the present invention, an optical sensor storage device using charge coupled device shift registers to record the optical image is provided wherein the device is exposed to the optical image continuously, that is, during the data sensing time duration as well as the shift time duration. Selected gates of the CCD shift register are pre-disposed for a given time duration to sense the image. Similarly, other gates are predisposed sequentially to shift the sensed image along the shift register. Regeneration of the recorded image data is provided after a number of shifts, wherein the number is selected so that the accumulated shift time is less than the given time duration to sense the image, thereby, providing a means for distinguishing between the full duration sensed image data and the image data sensed during shifting as a result of the continuous optical conveying of the image onto the shift register. The storage function is obtained by shifting the output of the shift register into the input and similarly, providing regeneration.

Accordingly, it is the main object of the present invention to provide a CCD shift register optical sensor which automatically compensates for continuous optical image exposure during shifting.

It is another object of the present invention to provide an optical sensor in which the optical image exposure time during shifting is kept less than the optical image exposure time for data sensing.

It is a further object of the present invention to provide charge data or sensing data regeneration before the exposure time during shifting is sufficient to cause a full exposure charge buildup within the device, thereby, allowing the full charge caused by the sensing time duration to be distinguished from the charge caused by the shift time exposure.

It is a further object of the present invention to provide an optical sensor which does not require separate storage, optical shuttering or optical illumination timing.

The foregoing and other objects, objectives and advantages of the invention will be apparent from the following more particular description of a preferred embodiment of the invention, as illustrated in the accompanying drawings.

DETAILED DESCRIPTION OF THE INVENTION

Figure 1:
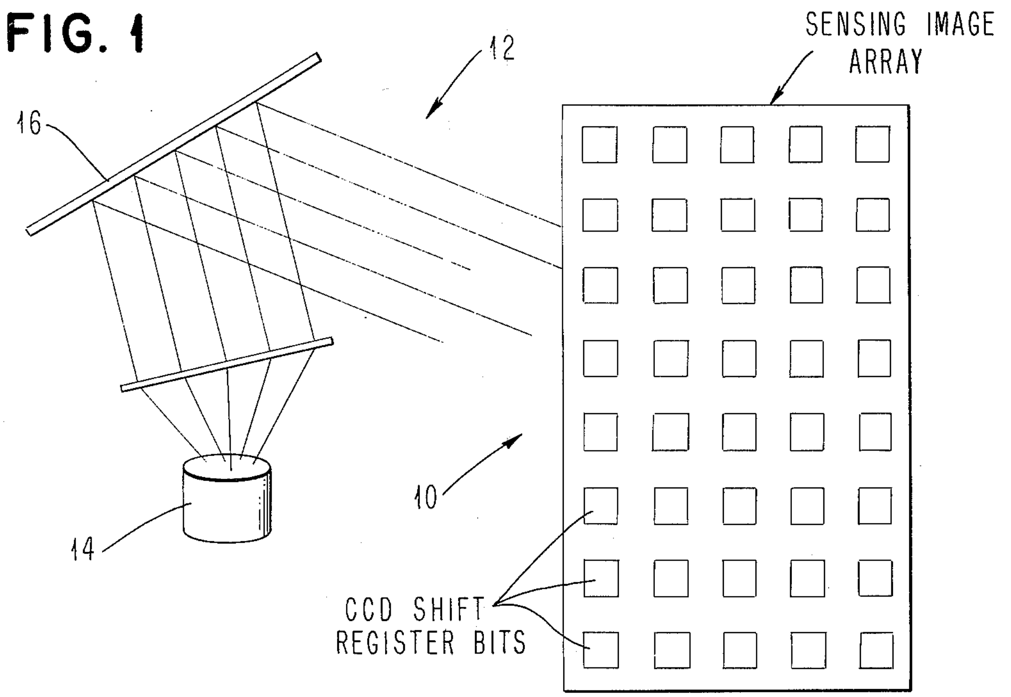
FIG. 1 is a schematic diagram showing the optical imaging arrangement used with a CCD shift register array to form an optical sensor.
Figure 2:
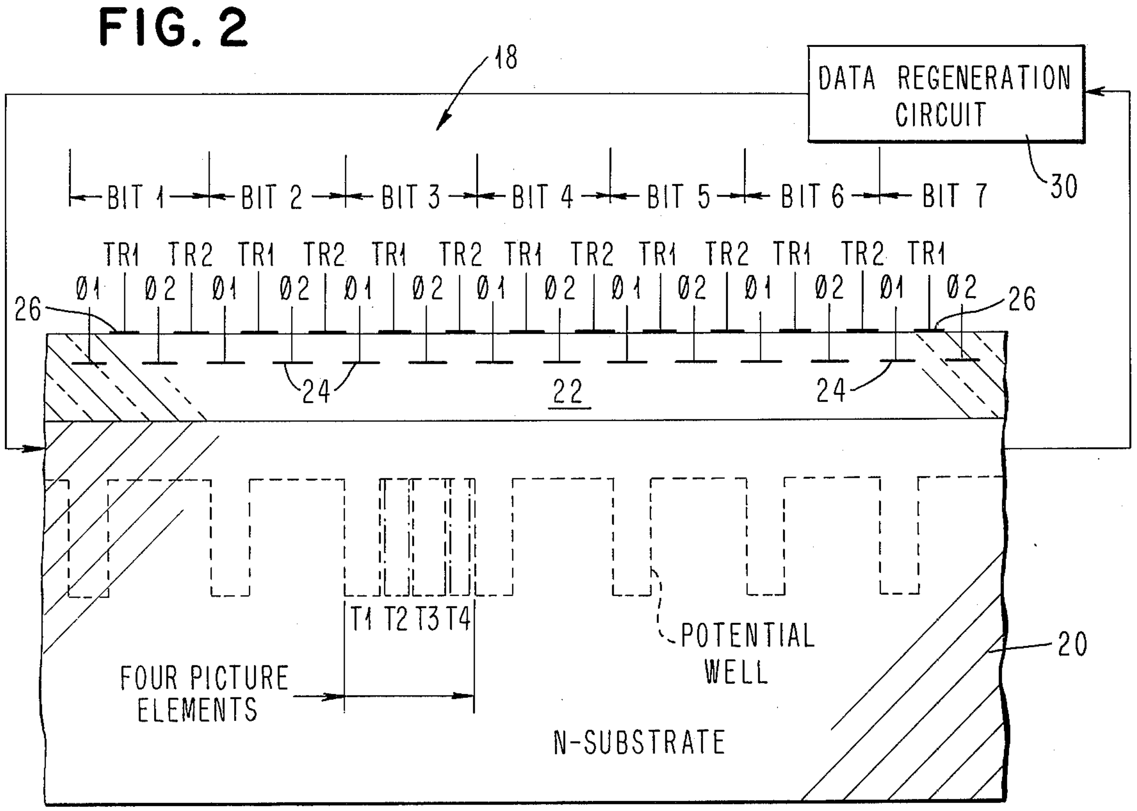
FIG. 2 is a section through a four-phase shift register storage device which senses an optical image in accordance with the present invention.

FIG. 1 is a schematic diagram showing a number of charge coupled devices 10 arranged to receive an image from an optical system 12. A light source 14 is utilized to illuminate the image 16, the reflection of which is focused onto the array of charge coupled device shift registers 10 which are arranged to record the image as charges within the devices. An individual charge coupled device shift register storage device 18 is shown in cross section in FIG. 2. The device 18 consists of an n type semiconductor substrate 20 containing a thin oxide layer 22 on one side thereof. A plurality of polysilicon gates or electrodes 24, designated as $\phi 1$ and $\phi 2$ are located in the thin oxide layer 22. Superimposed on thin oxide layer 22 are a number of metal gates or electrodes 26, designated as transfer gates TR1 and TR2, that are similar in size to the polysilicon gates 24. The gates $\phi 1$, TR1, $\phi 2$ and TR2 are arranged in sequence and constitute one bit of a CCD shift register 18 with the first bit, or bit 1 of the shift register located at the lefthand side of the drawing and the last bit of the register, which is partially shown as bit 7, located on the righthand side of the drawing. Of course, the shift register can contain many more bits. However, the 7 shown here are sufficient to describe the present invention. Feeding the output from the last stage of the shift register to the first stage as shown by feedback line 21 provides a dynamic storage or memory device.

In operation, all the electrodes are brought to ground potential so that all the data is cleared from the register. Subsequently, one of the $\phi$ lines, for example, all the $\phi 1$ electrodes 24, have a negative potential applied thereto creating a potential well under each of the $\phi 1$ gates. For example, the voltage on all the $\phi 1$ gates can be dropped to −10 volts thus creating a potential well or depletion region under each of the $\phi 1$ gates. These potential wells hold positive charge or minority carriers which constitute the data stored in the wells. After the $\phi 1$ gates 24 are reduced in potential, all the TR1 gates are reduced in potential to create a potential well under the TR1 gates and then the $\phi 1$ gates are increased in potential to eliminate the wells under the $\phi 1$ gates. As the potential on the $\phi 1$ gates 24 is increased, the positive charge stored in the wells under the $\phi 1$ gates pours out of those wells and into the newly created wells under the TR1 gates. Thus, the data in each bit of the shift register has been shifted in position from under the $\phi 1$ gates to under the TR1 gates in the bit. Once the data has been shifted, each $\phi 2$ gate is dropped in potential creating a well under the $\phi 2$ gates and then the TR1 gates are raised in potential to dump the positive charge stored under the TR1 gates into the well under the $\phi 2$ gate so that the data in each storage bit has been shifted to a position under the $\phi 2$ gate. Once the data is under the $\phi 2$ gates, the data is shifted under the TR2 gates by decreasing the potential on the TR2 gate and then increasing the potential under the $\phi 2$ gate. Now, the voltage on each $\phi 1$ gate is decreased and the voltage on each TR2 gate is increased to move the data from under the TR2 gate to under the $\phi 1$ gate in the next bit. Accordingly, the data is shifted from gate to gate in each bit and then into the next bit in the shift register by repeating the above-described sequence until the data stored in bit 1 is shifted through each gate of the shift register and out of the last stage of the register or recirculated to the input for storage. As previously pointed out, such CCD shift registers and their operation are well known in the art and it has been known to use them for optical sensing.

Optical sensing is accomplished by using essentially the same sequence of pulses just described except one of the periods of time used in the sequence is greatly expanded to generate data from the incident optical image. Assuming that the optical sensing is to be accomplished during the $\phi 1$ pulse time, then all the $\phi 1$ gates are reduced in potential, as before. This time, however, the period T1 is approximately 40N times as long as the period used during the shifting mode of operation describd above. Where N is the number of bits between refresh sites. While the voltage on the $\phi 1$ gates is in its lowered condition, the image is projected to the substrate as illustrated in FIG. 1. This causes a positive charge to collect in the potential wells under each of the $\phi 1$ gates, the amount of charge in any particular well being proportional to the time and intensity of incident light in the proximity of that well, therefore information as to the image is stored in the wells under the $\phi 1$ gates in the form of positive electric charge where the amount of charge stored in any particular well is dependent upon the time and intensity of the light applied to the substrate in the proximity of that well.

As pointed out above, the period T1 during which the voltage is lowered on the $\phi 1$ gates, which is defined as the image integration period, is approximately 40N times the length of the period when the voltage is lowered on the gates to cause shifting of data. The actual length of the period T1 is dependent upon the intensity of the light of the incident image; the stronger the light, the less time is necessary to maintain the $\phi 1$ gate down in order to integrate data as to the image. The period is determined by the length of time the $\phi 1$ pulse is down and the length of time the gate area is exposed to the incident light. In the prior art, the image is shifted into a non-photosensitive storage area before being read out. Once shifting the data from the light sensitive register into storage is completed, the register is in condition to be used to sense, by again sensitizing the $\phi 1$ gate by application of a negative pulse for the period T1 necessary to cause integration of an image under the gate. As can be seen from FIG. 2, the shift register has four gates per bit, the optical resolution of which would be one sensing well for every four gates. Of course, higher resolution systems are possible, that is, shift registers in which adjacent gates can be used for sensing at subsequent time periods.

In accordance with the present invention, the light source 14 and consequently the optical image 16 can be applied to the optical scanner 10 continuously. That is, during the shift operation as well as during the optical sensing period T1 (see FIG. 3). The present invention overcomes the need for any separate storage, electronic control of the light source or any shuttering of the optical image by providing a regeneration circuit 30 along the shift register 18 to provide regeneration of the stored image data and consequently distinguish this data from the data which is accumulated as charges in the wells under the gates when they are lowered in voltage to cause the necessary shifting operations. It is important that these regeneration circuits 30 be included in the shift register 18 at a position before which the accumulated time duration of the lowering of the gates to provide the shifting is about 1/10 the duration of time T1 necessary for full exposure of the image. In the case where the shift periods are one microsecond and the exposure time period is one millisecond, then theoretically 100 shifts could take place before the data requires regeneration. Accordingly, the regeneration circuitry 30 must be introduced before the stored information is shifted 100 times. Of course, the regeneration circuitry is introduced early enough so that the charge accumulated as a result of shift exposure can be easily distinguished from the charge accumulated by virtue of the image exposure time assuming, of course, that the light intensity is the same. It should also be appreciated that there are some losses entailed in shifting the charge from one well to another.

It should be appreciated that the invention makes it possible to use the charge coupled device shift register optical sensor as a storage or memory device. To use the device as a storage or memory requires the output of the shift register to be fed back or recirculated to the input by shifting similar to the shifting that takes place between other shift register stages within the device as previously described. Since the stored data is continuously shifted through the gates which are exposed to the image, data refreshing introduced in accordance with the criteria set forth above is necessary.

Figure 4:
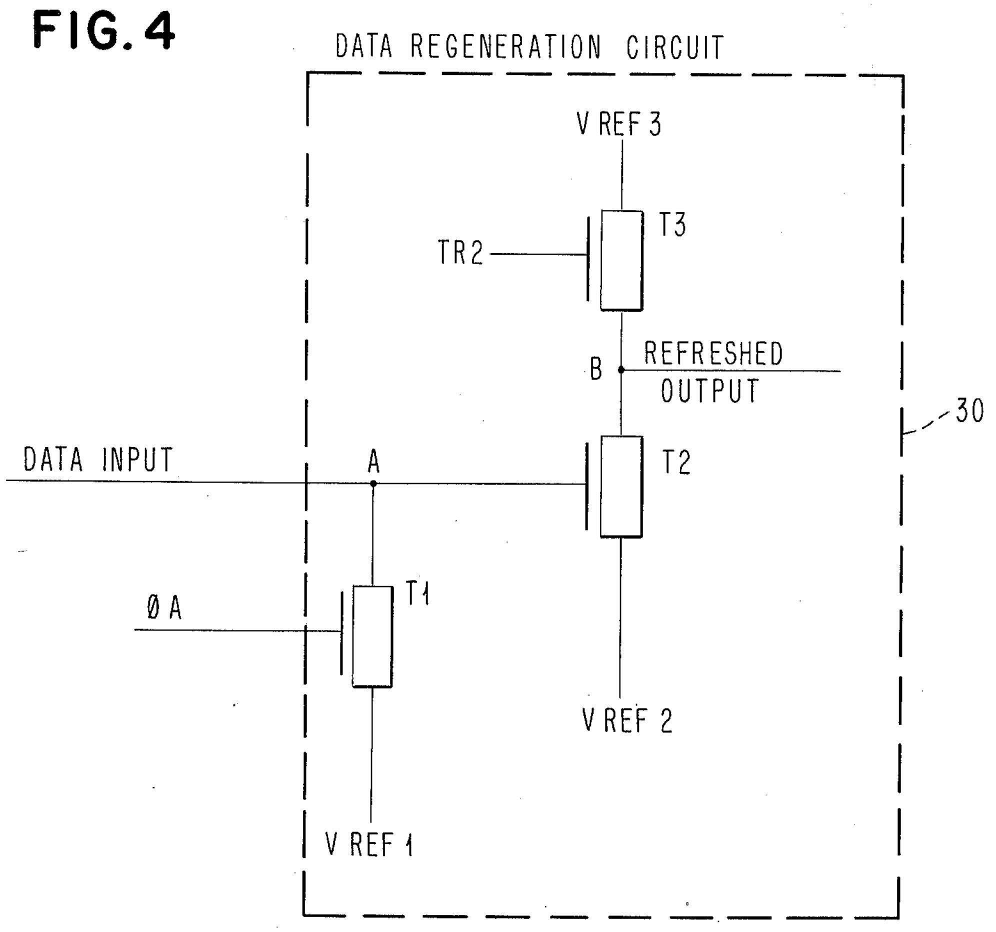
FIG. 4 is a schematic diagram of a system for providing the regeneration of data included in a CCD shift register in accordance with FIG. 2.

The regeneration circuit 30, sometimes referred to as a refresh amplifier, is shown in detail in FIG. 4.

Figure 3:
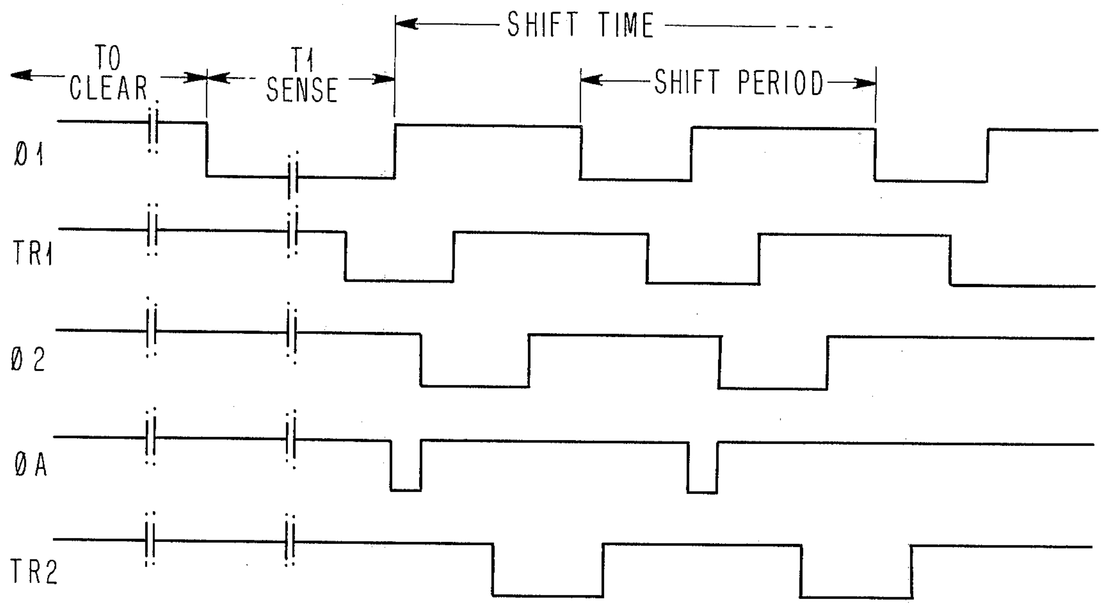
FIG. 3 shows the timing diagram and pulses applied to electrodes of the shift register in FIG. 2 to provide sensing and shifting in accordance with the present invention.

At $\phi$A time, shown in FIG. 3, the voltage at the gate of transistor T1 is at some potential that is negative with respect to Vrefl, so that T1 turns on and node A is charged to ≈ Vrefl. Vrefl is chosen to be slightly more negative with respect to the threshold voltage drop Vth2 across T2 and Vref2 so as to allow T2 to turn on and charge node B to Vref2, i.e. Vrefl < Vref2

– Vth2. As an example, if Vref2 = 0, and Vth2 = 1V then Vrefl $<$ −1 volt, say, −1.5V. After the $\phi$A time pulse returns to ground, node B is charged to Vref2. The charge accumulated in the adjacent well is transferred to node A at $\phi$2 time. This action is similar to one capacitor dumping charge into another through a switch. Consider the well to be capacitor Cwell and the node A to be capacitor CA. If CA is chosen much greater than Cwell (by design), the charge will redistribute at node A when the switch is closed causing the transfer. Since CA Cwell, the voltage at node A will change positive or negative depending on the amount of charge stored in Cwell. Since we have selected a OV charge to represent a 1 and a −10V charge to represent a 0, the voltage, in one case, will move well below −1.5V, thereby keeping T2 on and the output (at node B) at ground. In the other case, the voltage at node A moves above −1.5V turning T2 off and allowing the output at node B to go to Vref3 (−10V) when TR2 goes to −10V. It should be noted that the voltage at node B is the inverse of the voltage at node A. If for some reason Cwell is storing a charge slightly less than the voltage at CA, no discrimination takes place and the data at node B will go to some intermediate state, between −10 and 0 (Vref3 and Vref2). A subsequent regeneration circuit will resolve the bit to a one or a zero. If it chooses the wrong state, the image will have a black dot where it should have been white, or vice versa. This may decrease the resolution, however it should be negligible. In the following example, Vrefl = −1.5V, Vref2 = 0V (ground), Vref3 = −10V and CnodeA ≈ 2 Cwell. Node A is charged to −1.5 volts at $\phi$A time and T2 turns on charging node B to ground. Node A will go to −0.55 volts if a onen (−1V) is stored in the well turning off T2 and the output at node B charges to −10V when TR2 turns on. If the well stored a zero (−10V) then node A goes to ≈ −6.2V turning T2 on harder. Selecting T2 to have a W/L (width to length) ratio ≈ 30 times T3 the output will stay close to ground when T3 turns on at TR2 time.

The transistor T1, T2 and T3 can be MOS FET's which may be formed in the same substrate as the CCD's by proper diffusions.

The circuit distinguishes between inputs of or above a certain predetermined reference value and those below the predetermined reference value.

While the invention has been particularly shown and described with reference to a preferred embodiment thereof, it will be understood by those skilled in the art that the foregoing and other changes in form and detail may be made therein without departing from the spirit and scope of the invention.

What is claimed is:

1. A charge coupled device shift register used as an optical sensor of the type having shifting gates interspersed with integration gates in which the integration gates and shifting gates are continuously illuminated by the optical image to be recorded;

means or optically conveying the image to be recorded continuously onto said shift register array;

means for dropping sense gate voltage to selected gates of said shift register for a given time duration sufficient to sense said image in the form of charge collection in the wells beneath the selected gates;

means for dropping shift gate voltage to shift gates sequentially for comparatively short time durations with respect to said given time duration for sensing to shift said sensed image along said shift register while said shift gates have said image conveyed thereto by said optical conveying means;

means for re-generating the record image data after a predetermined number of shifts;

means for selecting the pre-determined number of shifts so that the accumulated shift time is less than said given time duration to sense said image, thereby providing a means of distinguishing between said full duration sensed image data and said image data sensed during shifting as a result of said continuous optical conveying of said image onto said shift register.

* * * * *